US011122211B2

(12) United States Patent
Renke et al.

(10) Patent No.: US 11,122,211 B2
(45) Date of Patent: Sep. 14, 2021

(54) MODULAR UNDER-VEHICLE CAMERA

(71) Applicant: GM GLOBAL TECHNOLOGY OPERATIONS LLC, Detroit, MI (US)

(72) Inventors: David T. Renke, Macomb, MI (US); Sorin Ratiu, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/793,168

(22) Filed: Feb. 18, 2020

(65) Prior Publication Data

US 2021/0258492 A1 Aug. 19, 2021

(51) Int. Cl.
*H04N 5/232* (2006.01)
*H04N 5/225* (2006.01)
*B60R 11/04* (2006.01)

(52) U.S. Cl.
CPC ......... *H04N 5/23299* (2018.08); *B60R 11/04* (2013.01); *H04N 5/2252* (2013.01); *H04N 5/2253* (2013.01); *B60K 2370/21* (2019.05); *B60R 2300/101* (2013.01); *B60R 2300/602* (2013.01)

(58) Field of Classification Search
None
See application file for complete search history.

(56) References Cited

U.S. PATENT DOCUMENTS

| | | | | |
|---|---|---|---|---|
| 3,552,699 A * | 1/1971 | Baker | ................ | F16M 11/2014 248/183.4 |
| 5,299,701 A * | 4/1994 | Barker | ...................... | A61J 7/04 215/216 |
| 5,365,291 A * | 11/1994 | Maeda | ................... | B64D 47/08 396/12 |
| 5,801,919 A * | 9/1998 | Griencewic | ........... | G06F 1/1686 348/552 |
| 6,234,691 B1 * | 5/2001 | Jones | ............... | G08B 13/19619 348/143 |
| 9,593,843 B2 * | 3/2017 | McRory | ............... | H04N 5/2256 |
| 9,817,298 B1 * | 11/2017 | Dhall | ..................... | G03B 17/02 |
| 9,995,993 B2 * | 6/2018 | Li | .......................... | F16M 11/28 |
| 10,178,209 B1 * | 1/2019 | Hesse | ..................... | H04M 1/04 |
| 10,894,515 B1 * | 1/2021 | Li | ....................... | H04N 5/2253 |
| 10,899,246 B1 * | 1/2021 | Babu | ...................... | B60L 53/16 |
| 2004/0095500 A1 * | 5/2004 | Sato | ................... | H04N 1/00535 348/340 |
| 2004/0228477 A1 * | 11/2004 | Lee | ...................... | H04N 5/2251 379/433.01 |

(Continued)

FOREIGN PATENT DOCUMENTS

| | | | | |
|---|---|---|---|---|
| EP | 3318447 A1 * | 5/2018 | ............ | B60R 11/04 |
| WO | WO-2013117998 A2 * | 8/2013 | ........... | E21B 31/005 |

*Primary Examiner* — Stefan Gadomski

(74) *Attorney, Agent, or Firm* — Quinn IP Law

(57) ABSTRACT

An imaging system for a vehicle including a cylindrical housing including a housing surface, the housing having a first end and a second end opposite the first end, an imaging sensor extending from the first end of the housing, the imaging sensor rotatable from a first position to a second position, a connection member coupled to the imaging sensor and enclosed within the housing, and a cap coupled to the housing at the second end, the cap including a cap surface having an alignment indicator. Rotation of the cap rotates the imaging sensor from the first position to the second position.

20 Claims, 3 Drawing Sheets

(56) References Cited

U.S. PATENT DOCUMENTS

| | | | |
|---|---|---|---|
| 2004/0246371 A1* | 12/2004 | Cho | H04N 7/142 |
| | | | 348/375 |
| 2005/0151877 A1* | 7/2005 | Fisher | H04N 7/142 |
| | | | 348/373 |
| 2005/0200740 A1* | 9/2005 | Kim | H04M 1/0264 |
| | | | 348/335 |
| 2007/0132610 A1* | 6/2007 | Guernalec | B60R 11/04 |
| | | | 340/932.2 |
| 2007/0151322 A1* | 7/2007 | Steinich | G01D 5/04 |
| | | | 73/1.75 |
| 2008/0151053 A1* | 6/2008 | Ishii | B60R 1/00 |
| | | | 348/148 |
| 2009/0291204 A1* | 11/2009 | Meredith | E04G 23/0203 |
| | | | 427/140 |
| 2010/0175298 A1* | 7/2010 | Thomas | F41G 11/001 |
| | | | 42/122 |
| 2011/0141281 A1* | 6/2011 | Barefoot | B60R 1/00 |
| | | | 348/148 |
| 2015/0036047 A1* | 2/2015 | Bledsoe | H04N 5/2253 |
| | | | 348/375 |
| 2015/0185093 A1* | 7/2015 | Kitzman | G01K 1/08 |
| | | | 73/862.381 |
| 2015/0195435 A1* | 7/2015 | Oshida | B60R 11/04 |
| | | | 348/373 |
| 2015/0306974 A1* | 10/2015 | Mardall | B60L 58/26 |
| | | | 320/150 |
| 2016/0090132 A1* | 3/2016 | Ramsey | H04N 5/332 |
| | | | 180/65.1 |
| 2016/0101734 A1* | 4/2016 | Baek | B60R 11/04 |
| | | | 348/148 |
| 2016/0119587 A1* | 4/2016 | Tan | B60R 1/00 |
| | | | 348/148 |
| 2016/0139061 A1* | 5/2016 | Kesselberg | H04N 5/23238 |
| | | | 348/37 |
| 2016/0223886 A1* | 8/2016 | Bellerive | F16M 11/26 |
| 2016/0323484 A1* | 11/2016 | Moenig | H04N 5/2257 |
| 2017/0136963 A1* | 5/2017 | Carson | H04N 5/2252 |
| 2017/0210304 A1* | 7/2017 | Davies | H04N 7/183 |
| 2017/0242321 A1* | 8/2017 | Hehir | G03B 17/55 |
| 2017/0244903 A1* | 8/2017 | Yang | H04N 5/23216 |
| 2017/0313167 A1* | 11/2017 | Fuchs | B60J 5/107 |
| 2017/0320437 A1* | 11/2017 | Liebau | G01S 15/06 |
| 2018/0001836 A1* | 1/2018 | Pan | B60R 13/105 |
| 2018/0292866 A1* | 10/2018 | Tucker | G06F 1/1686 |
| 2018/0309918 A1* | 10/2018 | Ghannam | H04N 5/2252 |
| 2018/0316831 A1* | 11/2018 | Nishino | B60R 11/04 |
| 2019/0033691 A1* | 1/2019 | Li | F16M 13/02 |
| 2019/0039531 A1* | 2/2019 | Wilson | B60S 1/0818 |
| 2019/0054941 A1* | 2/2019 | Hydro | B61L 27/0088 |
| 2019/0135216 A1* | 5/2019 | Church | G08G 1/165 |
| 2019/0279512 A1* | 9/2019 | Daniel | B60Q 9/008 |
| 2019/0328217 A1* | 10/2019 | Moreau | A61B 1/015 |
| 2020/0053260 A1* | 2/2020 | Qi | G02B 27/644 |
| 2020/0084413 A1* | 3/2020 | Lee | H04N 7/181 |
| 2020/0238910 A1* | 7/2020 | Wilson | B60S 1/04 |
| 2020/0349818 A1* | 11/2020 | Chou | B60R 11/04 |

\* cited by examiner

MODULAR UNDER-VEHICLE CAMERA

INTRODUCTION

The present disclosure relates generally to an imaging sensor, such as a camera, that is removably and modularly mounted to generate image data of an underside of a vehicle and a surface under a vehicle.

For some vehicle applications, such as off-road travel, it is beneficial to have a view of the underside of the vehicle and the surface over which the vehicle is traveling. Current imaging systems extend below the vehicle and may be damaged by debris or obstacles. It is also difficult to keep existing imaging systems clean.

SUMMARY

Embodiments according to the present disclosure provide a number of advantages. For example, embodiments according to the present disclosure enable easy accessibility to an under-vehicle imaging system. The modular imaging system discussed herein can be easily removed from within the vehicle for cleaning and repair.

In one aspect of the present disclosure, an imaging system for a vehicle includes a cylindrical housing including a housing surface, the housing having a first end and a second end opposite the first end, an imaging sensor extending from the first end of the housing, the imaging sensor rotatable from a first position to a second position, a connection member coupled to the imaging sensor and enclosed within the housing, and a cap coupled to the housing at the second end, the cap including a cap surface having an alignment indicator. Rotation of the cap rotates the imaging sensor from the first position to the second position.

In some aspects, the imaging sensor is a unidirectional optical sensor.

In some aspects, the connection member is a wire.

In some aspects, the imaging system further includes a rotation mechanism enclosed within the housing, the rotation mechanism coupled to the cap and to the imaging sensor such that rotation of the cap rotates the imaging sensor.

In some aspects, the imaging system further includes a pivot member positioned between the first end of the housing and the imaging sensor, the pivot member coupled to the rotation mechanism and the imaging sensor such that rotation of the cap rotates the imaging sensor independent of the housing.

In some aspects, the rotation mechanism is a rod extending between the cap and the imaging sensor.

In some aspects, the rotation mechanism is an actuator configured to rotate the imaging sensor from the first position to the second position.

In some aspects, the housing is rotatable with the cap and the imaging sensor from the first position to the second position.

In some aspects, the imaging sensor is electronically coupled to a controller configured to generate a control signal to rotate the imaging sensor from the first position to the second position.

In some aspects, the imaging system further includes a connection interface extending from the housing and coupled to the connection member.

In another aspect of the present disclosure, an automotive vehicle includes a vehicle body including a vehicle floor, the vehicle body and vehicle floor enclosing a passenger compartment, a console positioned within the passenger compartment and extending from the vehicle floor into the passenger compartment, the console including a console surface, and an imaging system. The imaging system includes a cylindrical housing including a housing surface, the housing having a first end and a second end opposite the first end, an imaging sensor extending from the first end of the housing, the imaging sensor rotatable from a first position to a second position, a connection member coupled to the imaging sensor and enclosed within the housing, and a cap coupled to the housing at the second end, the cap including a cap surface having an alignment indicator. The housing of the imaging system extends through the console surface and the vehicle floor such that the cap of the imaging system is rotatable from within the passenger compartment and the imaging sensor extends below the vehicle floor.

In some aspects, the imaging sensor is a unidirectional optical sensor.

In some aspects, the imaging system further includes a rotation mechanism enclosed within the housing, the rotation mechanism coupled to the cap and to the imaging sensor such that rotation of the cap rotates the imaging sensor.

In some aspects, the imaging system further includes a pivot member positioned between the first end of the housing and the imaging sensor, the pivot member coupled to the rotation mechanism and the imaging sensor such that rotation of the cap rotates the imaging sensor independent of the housing.

In some aspects, the rotation mechanism is a rod extending between the cap and the imaging sensor.

In some aspects, the rotation mechanism is an actuator configured to rotate the imaging sensor from the first position to the second position.

In some aspects, the housing is rotatable with the cap and the imaging sensor from the first position to the second position.

In some aspects, the imaging sensor is electronically coupled to a controller configured to generate a control signal to rotate the imaging sensor from the first position to the second position.

In some aspects, the console surface includes a viewing direction indicator and the alignment indicator aligns with the viewing direction indicator to indicate a viewing direction of the imaging sensor.

In another aspect of the present disclosure, an imaging system for a vehicle includes a cylindrical housing including a housing surface, the housing having a first end and a second end opposite the first end, an imaging sensor extending from the first end of the housing, the imaging sensor rotatable from a first viewing position to a second viewing position, a pivot member rotatably coupled to the first end of the housing and fixedly coupled to the imaging sensor, a cap coupled to the housing at the second end, the cap including a cap surface having an alignment indicator, and a rotation mechanism coupled to the cap and the pivot member. Rotation of the cap rotates the imaging sensor from the first position to the second position.

BRIEF DESCRIPTION OF THE DRAWINGS

The present disclosure will be described in conjunction with the following figures, wherein like numerals denote like elements.

Figure 2:
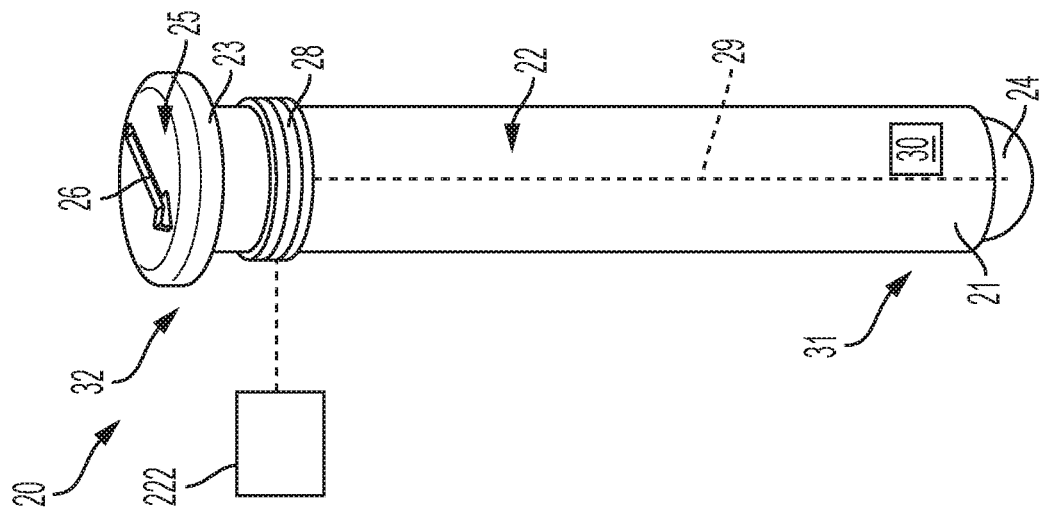
FIG. 2 is a schematic side perspective view of an under-vehicle imaging system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Vehicle operators often desire imaging information of the underside of the vehicle, or a ground surface over which the vehicle is traveling. This imaging information can assist in diagnoses of vehicle issues, such as entrapment of debris in vehicle components, for example, and also to identify obstacles under the vehicle that may cause damage to underbody vehicle components. The imaging systems disclosed herein extend through the vehicle floor to provide imaging of the underside of the vehicle while also being easily removable to access the sensor lens for cleaning or repair.

Figure 1:
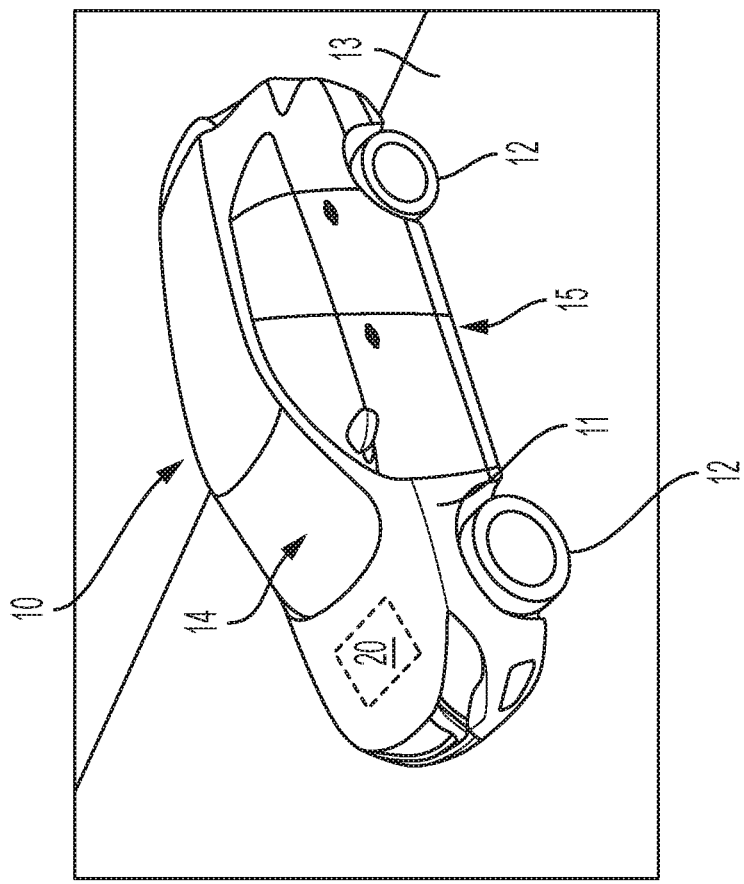
FIG. 1 is a schematic illustration of a vehicle including an under-vehicle imaging system, according to an embodiment.

FIG. 1 schematically illustrates a vehicle 10 including an under-vehicle imaging system 20, according to an embodiment. The vehicle 10 includes a vehicle body 11 that encloses a passenger compartment 14. Vehicle wheels 12 are coupled to each corner of the vehicle body 11. The vehicle 10 includes an underbody 15 that is approximately parallel to a traveling surface 13. In various scenarios, the traveling surface 13 includes debris or other obstacles over which the vehicle 10 can pass; however, travel of the vehicle 10 over the obstacles may damage various underbody components of the vehicle 10. The vehicle 10 includes an imaging system 20 to provide imaging data regarding underbody components and surface obstacles under the vehicle 10. While the vehicle 10 is illustrated as a passenger car, it is understood that the vehicle 10 may be any type of vehicle including truck, SUV, off-road vehicle, etc., for example and without limitation.

FIG. 2 schematically illustrates one embodiment of an imaging system 20 for use with the vehicle 10. The imaging system 20 includes a cylindrical housing 21 including a housing surface 22, a cap 23, and an imaging sensor 24. The imaging sensor 24 extends from a first end 31 of the housing 21 and the cap 23 is positioned at the second end 32 of the housing 21 opposite the first end 31. In various embodiments, the cap 23 is a screw-on style cap that is coupled to the housing 21 via interlocking screw threads. The cap 23 includes a cap surface 25. In various embodiments, an alignment indicator 26 is etched, printed, or otherwise marked on the cap surface 25. The alignment indicator 26 is visible from inside the vehicle 10, as discussed herein, and is used to indicate the direction of view of the imaging sensor 24.

In various embodiments, the housing surface 22 includes at least one ring 28. The ring 28 provides power and/or communication connection to the imaging sensor 24. In various embodiments, the housing 21 encloses an actuator 30 configured to control a viewing direction of the imaging sensor 24. In various embodiments, the housing 21 encloses wires 29 for electrical and communication connections between the imaging sensor 24 and a controller, such as a vehicle controller 222. While depicted as a single unit for illustrative purposes, the controller 222 may additionally include one or more other controllers, collectively referred to as a "controller." The controller 222 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 222 in controlling the connected components, such as the actuator 30.

The imaging sensor 24 may be any type of imaging sensor such as, for example and without limitation, a unidirectional optical sensor or camera, a 360-degree camera, or a 180- degree camera. In various embodiments, the housing 21 encloses a rotation mechanism 30 coupled to the cap 23 and the imaging sensor 24. In various embodiments, the rotation mechanism 30 is a mechanical rotation mechanism such as a rod coupled to the cap 23 and the imaging sensor 24. In various embodiments, the rotation mechanism 30 is an actuator coupled to the imaging sensor and in electronic communication with the controller 222. In various embodiments, rotation of the cap 23 about a longitudinal axis of the cylindrical housing 21 rotates the imaging sensor 24. Because the cap 23 is accessible within the passenger compartment 14 of the vehicle 10, the imaging sensor 24 can be easily rotated to provide the desired view.

Figure 4:
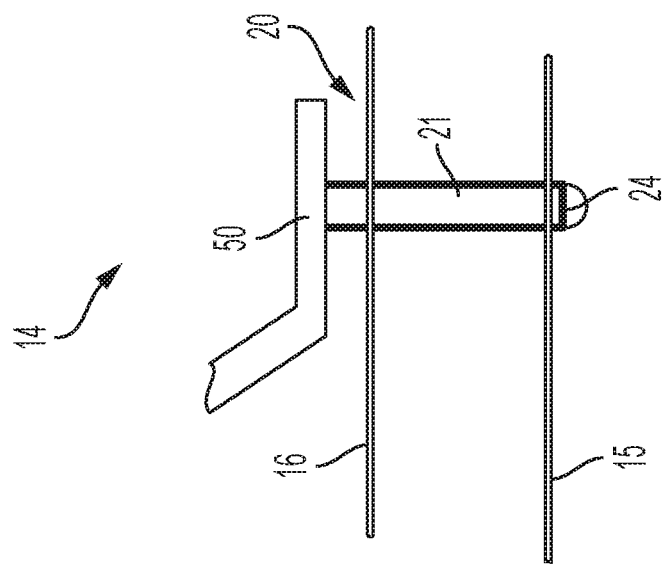
FIG. 4 is a schematic partial side view of the passenger compartment of FIG. 3, according to an embodiment.
Figure 3:
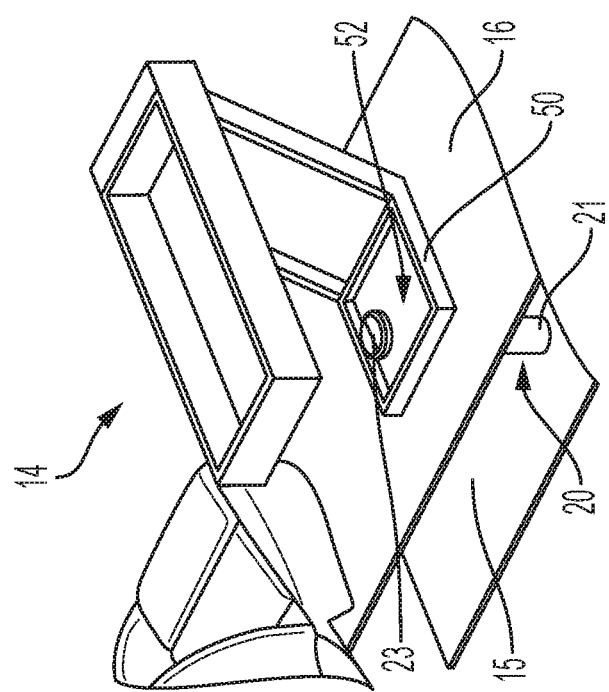
FIG. 3 is a schematic partial perspective view of a passenger compartment of a vehicle including the under-vehicle imaging system of FIG. 2, according to an embodiment.

As shown in FIGS. 3 and 4, in various embodiments, the imaging system 20 is incorporated into a console 50 positioned within the passenger compartment 14 of the vehicle 10. The console 50 includes a console surface 52 through which extends a portion of the imaging system 20, specifically, the cap 23. The imaging system 20 extends through a vehicle or cabin floor 16 of the vehicle 10 and also through the underbody 15 of the vehicle 10. With reference to FIG. 4, the imaging sensor 24 extends below the surface of the underbody 15 of the vehicle 10 while the cap 23 is positioned within the console 50 within access of a vehicle occupant. In various embodiments, the cap 23 can be manually rotated by the occupant to turn the housing 21 and the imaging sensor 24 to adjust a viewing direction of the imaging sensor 24. In various embodiments, a viewing direction of the imaging sensor 24 is adjusted independently of the housing 21. In various embodiments, a viewing direction of the imaging sensor 24 is adjusted by the rotation mechanism 30, such as an actuator, controlled by a controller, such as the controller 222.

Figure 5:
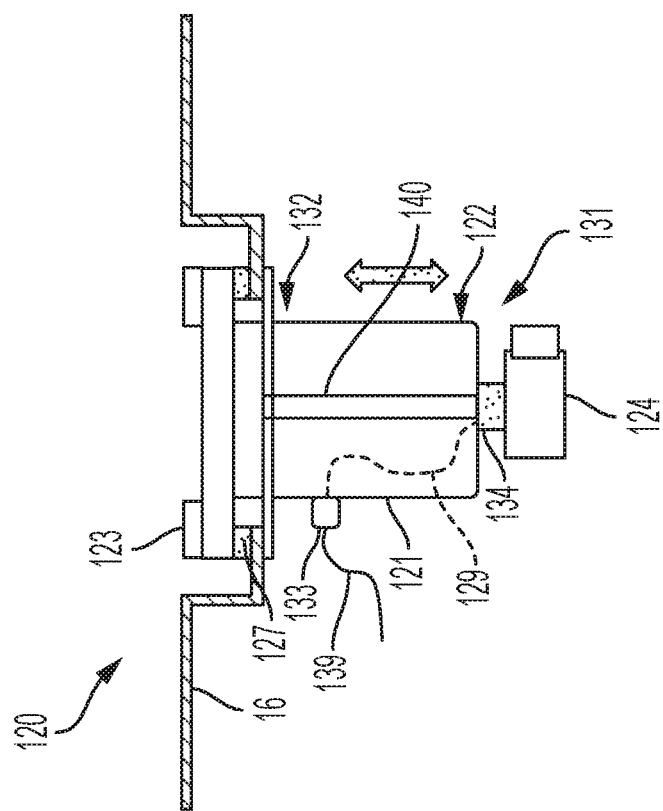
FIG. 5 is a schematic section view of an under-vehicle imaging system, according to another embodiment.

With reference now FIG. 5, another embodiment of an imaging system 120 is illustrated. The imaging system 120 includes a cylindrical housing 121 including a housing surface 122, a cap 123, and an imaging sensor 124. The imaging sensor 124 extends from a first end 131 of the housing 121 and the cap 123 is positioned at the second end 132 of the housing 121 opposite the first end 131. In various embodiments, the housing 121 encloses internal wires 129 for electrical and communication connections between the imaging sensor 124 and a controller, such as the vehicle controller 222. In various embodiments, the housing 121 includes a connection interface 133 to couple the wires 129 inside the housing 121 with external wires 139 extending outside the housing 121 to directly or indirectly connect the imaging sensor 124 with the controller 222.

In various embodiments, the imaging sensor 124 is any type of imaging sensor such as, for example and without limitation, a single direction camera, a 360-degree camera, or a 180-degree camera. In the illustrated embodiment, the imaging sensor 124 is coupled to a pivot member 134. The pivot member 134 is rotatably coupled to the first end 131 of the housing 121 and fixedly coupled to the imaging sensor 124. Rotation of the cap, for example, drives rotation of the imaging sensor 124 via the pivot member 134. As discussed, rotation of the imaging sensor 124 may be via any type of mechanical or electronic means and may be manually controlled or electronically controlled. As shown, in various embodiments, a rotation mechanism 140, such as a rod, is coupled to the cap 123 and the imaging sensor 124 via the pivot member 134 such that rotation of the cap 123 rotates the pivot member 134 and the imaging sensor 124. In various embodiments, rotation of the imaging sensor 124 via the pivot member 134 coupled to the rotation mechanism 140 results in rotation of the imaging sensor 124 independent of the housing 121.

In various embodiments, the cap 123 is a screw-on style cap that is coupled to the housing 121 via interlocking screw threads. In various embodiments, a sealing member 127 is positioned between the cap 123 and the vehicle floor 16.

Figure 6:
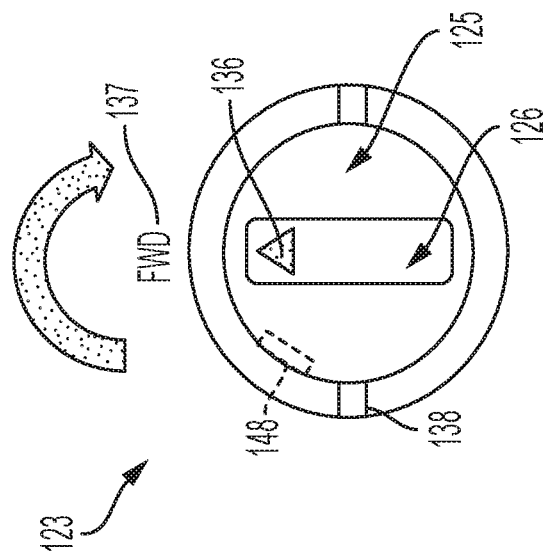
FIG. 6 is a schematic top view of a cap of the under-vehicle imaging system, according to an embodiment.

With reference to FIG. 6, the cap 123 includes a cap surface 125. In various embodiments, an alignment indicator 126 is etched, printed, or otherwise marked on the cap surface 125. The alignment indicator 126 is visible from inside the vehicle 10, as discussed herein, and is used to indicate the direction of view of the imaging sensor 124. In various embodiments, the alignment indicator 126 includes an arrow 136. The cap 123 can be manually or electronically rotated (thus also rotating the imaging sensor 124) such that the alignment indicator 126 aligns with a viewing direction indicator 137 indicative of a viewing direction of the imaging sensor 124. In various embodiments, the viewing direction indicator 137 is formed or placed on a surface adjacent to the cap surface 125, such as the console surface 52. In various embodiments, the cap surface 125 includes one or more raised members 138 configured to be gripped for hand tightening and rotation of the cap 123. In various embodiments, the cap 123 can be locked into place using one or more locking or alignment tabs 148. In various embodiments, the locking tabs 148 lock into place after partial rotation of the cap 123.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An imaging system for a vehicle having a vehicle floor, comprising:
   a cylindrical housing including a housing surface, the housing having a first end and a second end opposite the first end;
   an imaging sensor extending from the first end of the housing, the imaging sensor rotatable from a first position to a second position;
   a connection member coupled to the imaging sensor and enclosed within the housing; and
   a cap coupled to the housing at the second end, the cap including a cap surface having an alignment indicator;
   wherein the housing of the imaging system extends through the vehicle floor such that the the imaging sensor extends below the vehicle floor and rotation of the cap rotates the imaging sensor from the first position to the second position.

2. The imaging system of claim 1, wherein the imaging sensor is a unidirectional optical sensor.

3. The imaging system of claim 1, wherein the connection member is a wire.

4. The imaging system of claim 1 further comprising a rotation mechanism enclosed within the housing, the rotation mechanism coupled to the cap and to the imaging sensor such that rotation of the cap rotates the imaging sensor.

5. The imaging system of claim 4 further comprising a pivot member positioned between the first end of the housing and the imaging sensor, the pivot member coupled to the rotation mechanism and the imaging sensor such that rotation of the cap rotates the imaging sensor independent of the housing.

6. The imaging system of claim 4, wherein the rotation mechanism is a rod extending between the cap and the imaging sensor.

7. The imaging system of claim 4, wherein the rotation mechanism is an actuator configured to rotate the imaging sensor from the first position to the second position.

8. The imaging system of claim 1, wherein the housing is rotatable with the cap and the imaging sensor from the first position to the second position.

9. The imaging system of claim 1, wherein the imaging sensor is electronically coupled to a controller configured to generate a control signal to rotate the imaging sensor from the first position to the second position.

10. The imaging system of claim 1 further comprising a connection interface extending from the housing and coupled to the connection member.

11. An automotive vehicle, comprising:
    a vehicle body including a vehicle floor, the vehicle body and vehicle floor enclosing a passenger compartment;
    a console positioned within the passenger compartment and extending from the vehicle floor into the passenger compartment, the console including a console surface; and
    an imaging system comprising:
      a cylindrical housing including a housing surface, the housing having a first end and a second end opposite the first end;
      an imaging sensor extending from the first end of the housing, the imaging sensor rotatable from a first position to a second position;
      a connection member coupled to the imaging sensor and enclosed within the housing; and
      a cap coupled to the housing at the second end, the cap including a cap surface having an alignment indicator;
    wherein the housing of the imaging system extends through the console surface and the vehicle floor such that the cap of the imaging system is rotatable from within the passenger compartment and the imaging sensor extends below the vehicle floor.

12. The automotive vehicle of claim 11, wherein the imaging sensor is a unidirectional optical sensor.

13. The automotive vehicle of claim 11, wherein the imaging system further comprises a rotation mechanism enclosed within the housing, the rotation mechanism coupled to the cap and to the imaging sensor such that rotation of the cap rotates the imaging sensor.

14. The automotive vehicle of claim 13, wherein the imaging system further comprises a pivot member positioned between the first end of the housing and the imaging sensor, the pivot member coupled to the rotation mechanism and the imaging sensor such that rotation of the cap rotates the imaging sensor independent of the housing.

15. The automotive vehicle of claim 14, wherein the rotation mechanism is a rod extending between the cap and the imaging sensor.

16. The automotive vehicle of claim 14, wherein the rotation mechanism is an actuator configured to rotate the imaging sensor from the first position to the second position.

17. The automotive vehicle of claim 11, wherein the housing is rotatable with the cap and the imaging sensor from the first position to the second position.

18. The automotive vehicle of claim 11, wherein the imaging sensor is electronically coupled to a controller configured to generate a control signal to rotate the imaging sensor from the first position to the second position.

19. The automotive vehicle of claim 11, wherein the console surface includes a viewing direction indicator and the alignment indicator aligns with the viewing direction indicator to indicate a viewing direction of the imaging sensor.

20. An imaging system for a vehicle having a vehicle floor, comprising:

a cylindrical housing including a housing surface, the housing having a first end and a second end opposite the first end;

an imaging sensor extending from the first end of the housing, the imaging sensor rotatable from a first viewing position to a second viewing position;

a pivot member rotatably coupled to the first end of the housing and fixedly coupled to the imaging sensor;

a cap coupled to the housing at the second end, the cap including a cap surface having an alignment indicator; and a rotation mechanism coupled to the cap and the pivot member;

wherein the housing of the imaging system extends through the vehicle floor such that the imaging sensor extends below the vehicle floor and rotation of the cap rotates the imaging sensor from the first position to the second position.

* * * * *